US012186767B2

(12) United States Patent
Wilger

(10) Patent No.: US 12,186,767 B2
(45) Date of Patent: Jan. 7, 2025

(54) SOLENOIDS FOR MOBILE SPRAYERS

(71) Applicant: Wilger Industries Ltd., Saskatoon (CA)

(72) Inventor: Wilfred H. Wilger, Saskatoon (CA)

(73) Assignee: Wilger Industries Ltd., Saskatoon (CA)

( * ) Notice: Subject to any disclaimer, the term of this patent is extended or adjusted under 35 U.S.C. 154(b) by 450 days.

(21) Appl. No.: 17/575,785

(22) Filed: Jan. 14, 2022

(65) Prior Publication Data

US 2022/0219178 A1  Jul. 14, 2022

(30) Foreign Application Priority Data

Jan. 14, 2021  (CA) ..................... 3106227

(51) Int. Cl.
    *B05B 1/30*        (2006.01)
    *H01F 7/16*        (2006.01)

(52) U.S. Cl.
    CPC ............. *B05B 1/3053* (2013.01); *H01F 7/16* (2013.01); *H01F 2007/1669* (2013.01)

(58) Field of Classification Search
    CPC .. B05B 1/3053; H01F 7/16; H01F 2007/1669
    USPC ........................................................ 239/447
    See application file for complete search history.

(56) References Cited

U.S. PATENT DOCUMENTS

| | | | | |
|---|---|---|---|---|
| 5,908,161 A | * | 6/1999 | Womac | B05B 1/3046 239/533.1 |
| 5,967,066 A | * | 10/1999 | Giles | A01C 23/024 111/119 |
| 6,019,347 A | * | 2/2000 | Adams | F16K 31/0655 251/129.05 |
| 6,126,088 A | | 10/2000 | Wilger et al. | |
| 6,302,080 B1 | * | 10/2001 | Kato | F02D 41/403 239/464 |
| 6,324,046 B1 | * | 11/2001 | Kadah | H01F 7/1816 361/247 |
| 6,374,624 B1 | * | 4/2002 | Cholkeri | F16K 31/0651 251/129.21 |
| 6,493,204 B1 | * | 12/2002 | Glidden | B60T 8/366 361/187 |
| 6,522,948 B1 | | 2/2003 | Benneweis | |
| 6,877,675 B2 | | 4/2005 | Benneweis | |
| 7,311,004 B2 | * | 12/2007 | Giles | A01M 7/0096 239/176 |

(Continued)

*Primary Examiner* — Chee-Chong Lee
(74) *Attorney, Agent, or Firm* — Husch Blackwell LLP

(57) ABSTRACT

A mobile sprayer apparatus includes a direct current electrical supply, and a supply conduit operative to supply pressurized liquid to a plurality of nozzle assemblies. Each nozzle assembly comprises a channel connecting the supply conduit to a nozzle, a valve operative to selectively open and close the channel, and a solenoid coil operative to selectively move the valve to an open position when a direct current electrical pulse is connected to pass through the solenoid coil in a first direction, and to selectively move the valve to a closed position when a direct current electrical pulse is connected to pass through the solenoid coil in an opposite second direction. A switch selectively delivers a pulse of electrical energy through each solenoid coil in the first direction or through each solenoid coil in the second opposite direction, and no electrical energy is delivered to the solenoid coils between pulses.

5 Claims, 1 Drawing Sheet

(56) References Cited

U.S. PATENT DOCUMENTS

2019/0040972 A1* 2/2019 Schrader .................. H01F 7/18

* cited by examiner

SOLENOIDS FOR MOBILE SPRAYERS

CROSS-REFERENCE TO RELATED APPLICATION

The present application claims the benefit of Canadian Application No. 3,106,227 entitled "SOLENOIDS FOR MOBILE SPRAYERS", filed Jan. 14, 2021, which is incorporated herein by reference in its entirety.

TECHNICAL FIELD

This disclosure relates to the field of spraying equipment and in particular mobile sprayers for spraying a surface such as an agricultural field, golf course, roadway, or the like.

BACKGROUND OF THE INVENTION

There are many applications where it is necessary to spray a fluid material onto a target surface, often the ground. This application is notable for example in agriculture, horticulture and such things as golf course maintenance and pest control where chemicals are mixed with water and then sprayed on the ground, on plants growing from the ground, on bodies of water, and the like. Various fluids must also often be sprayed on roadways and other surfaces as well.

Spraying is accomplished with sprayers, either self-propelled or towed units, and with aerial sprayers mounted on airplanes or helicopters. Such sprayers commonly comprise a tank of fluid, a pump for pressurizing and distributing the fluid to spray nozzles and means to control the fluid pressure. Sprayers typically have a plurality of nozzle bodies, each securing a spray nozzle, mounted on booms which swing in for transport and out for operation. Airplane mounted sprayers typically have a boom fixed to the wings.

The nozzle locations are spaced apart on a boom, perpendicular to the direction of travel, at a standard spacing distance which corresponds to the spray pattern of the nozzles. The same size nozzle is in operating position at each nozzle location, providing a consistent application rate across the width of the sprayer.

Such sprayers must accurately dispense the fluid over the desired area of target surface. Historically this has been accomplished by providing a spray nozzle having a set operating pressure such that when operated at that pressure, the nozzle accurately dispensed a known amount of fluid per time unit. Operating the sprayer at a known speed then accurately resulted in the correct amount of fluid being dispensed over a given area, however as the speed increased or decreased the application rate increased or decreased accordingly.

To help overcome this problem, "extended range" nozzles were developed which maintained an accurate distribution across the width of the spray pattern at a range of pressures from approximately 20 psi to 60 psi. If the operator wants to spray at an increased or decreased speed, he increases or decreases the pressure to maintain the desired application rate. Such extended range nozzles provide satisfactory spray patterns over a range of about 30% above or below a mid-point rate, however where larger rate changes are required, a nozzle change is required.

Rate controllers became available as well which measure the total flow of fluid along the boom to the nozzles and automatically vary the pressure as the speed varies, maintaining a total flow to the nozzles that will maintain a stable application rate along the boom as speed varies. These rate controllers can also be used to vary the application rate by maintaining a constant speed, and varying the pressure. Variable application rates have become desirable with the advent of field mapping, where different areas of a field are best treated with different rates of the particular liquid being applied.

Modern agriculture/horticulture sprayers typically have a boom with multiple spray sections that can be independently controlled. Usually a master control means is used to control the entire boom, while each section may have its own control or switch. Liquid pressure in each section can be varied by a rate controller to apply different rates to field portions passed over by each section, and flow to any section can be stopped completely if desired.

External location and guidance systems utilizing Global Positioning Satellites (GPS), local broadcasting towers, and the like have allowed sprayers to be located and also guided precisely, and also provide precision control of application rates and avoidance of spray overlap as described for example in U.S. Pat. Nos. 6,522,948 and 6,877,675 to Benneweis.

U.S. Pat. No. 6,126,088 to the present inventor Wilger discloses a nozzle mounting and control system for use in sprayers comprising multiple nozzles mounted in the operating position at each nozzle location on a sprayer boom such that 2, 3, or more nozzles pass over the same target surface. Wide ranges of application rates are achieved by control valves operable to select which nozzles are open and operating at any given time. The valves may be remote controlled and may further incorporate a rate controller to maintain a chosen application rate by opening and closing appropriate valves as the sprayer speed varies, and/or by varying the pressure in the conduits supplying the nozzles.

SUMMARY OF THE INVENTION

The present disclosure provides a spraying apparatus that overcomes problems in the prior art.

A solenoid is one typical valve used to turn sprayer nozzles off and on to avoid overlap or change spraying rates in the prior art. In order to stop drips and seal the liquid in the sprayer these solenoids are typically configured to be "normally closed" such that when no electrical power is being applied to the coil the valves are closed, and then the valves open when electrical power is applied to the coil.

In mobile sprayers this can be a significant challenge to the electrical charging system of the vehicle involved, be it a tractor or a self-propelled vehicle. To keep any particular valve open, electrical power must be continuously provided, and when it is turned off, the valve closes.

This electrical power requirement limits the use to which solenoids can be used in mobile sprayers. The present disclosure employs latching or bistable solenoids to provide a significantly wider range of options for the use of solenoids.

For example as discussed above where there are three nozzles at each nozzle location it has typically been the case that switching from one combination to another was accomplished with pressurized air or manually, since maintain electrical power to one or more solenoids at each location was not practically possible. The latching solenoids of the present disclosure allow the on/off selection of each of these nozzles with a short lived pulse of electricity, with no constant electrical power required.

Such latching solenoids work in a different manner, in that a momentary contact with a direct current electrical source with one polarity switches it from on to off, and then another momentary contact with the DC electrical power with the opposite polarity switches it from off to on—once the latching solenoids are either off or on, there is no further electrical power required.

The present disclosure provides a mobile sprayer apparatus comprising a direct current electrical supply, and a supply conduit operative to supply pressurized liquid to a plurality of nozzle assemblies. Each nozzle assembly comprises a channel connecting the supply conduit to a nozzle, a valve operative to selectively open and close the channel, and a solenoid coil operative to selectively move the valve to an open position when a direct current electrical pulse is connected to pass through the solenoid coil in a first direction, and to selectively move the valve to a closed position when a direct current electrical pulse is connected to pass through the solenoid coil in an opposite second direction. A switch is connected to the direct current electrical supply and is operative to selectively deliver a pulse of electrical energy through each solenoid coil in the first direction or through each solenoid coil in the second opposite direction, and no electrical energy is delivered to the solenoid coils between pulses.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE DRAWINGS

Figure 1:
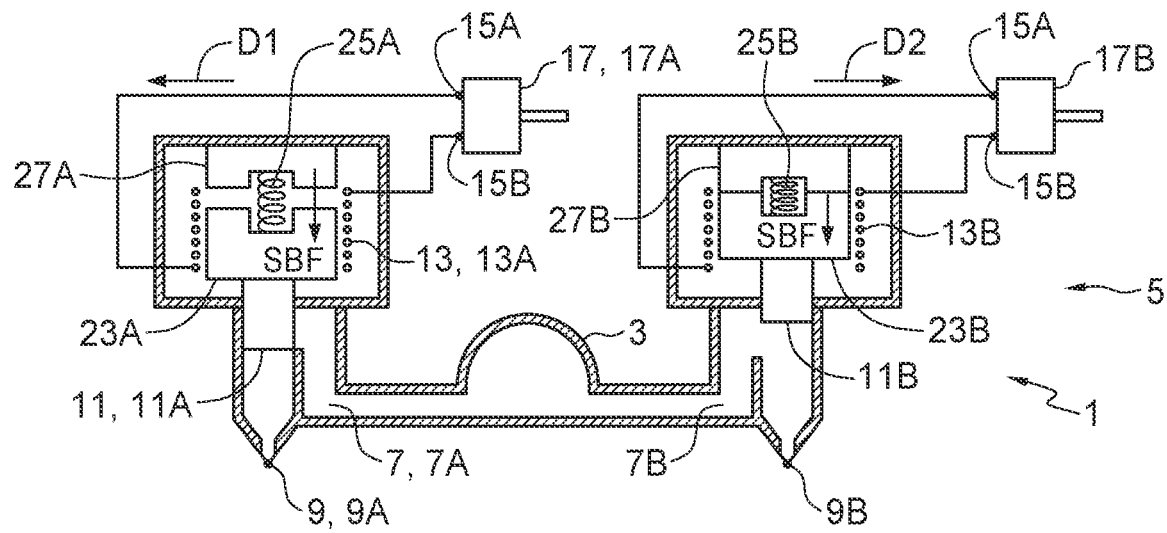
FIG. 1 is a schematic sectional side view of a dual nozzle body for use with the solenoid coils of the present disclosure.
Figure 2:
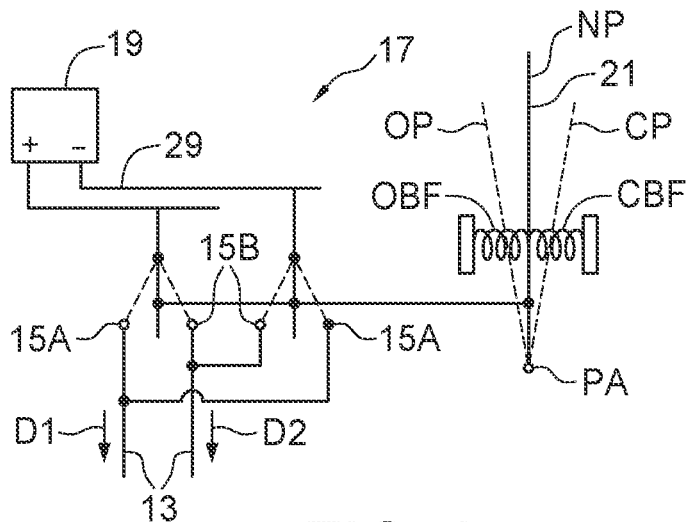
FIG. 2 is a schematic side view of a switch for use with the solenoid coils of the present disclosure.
Figure 3:
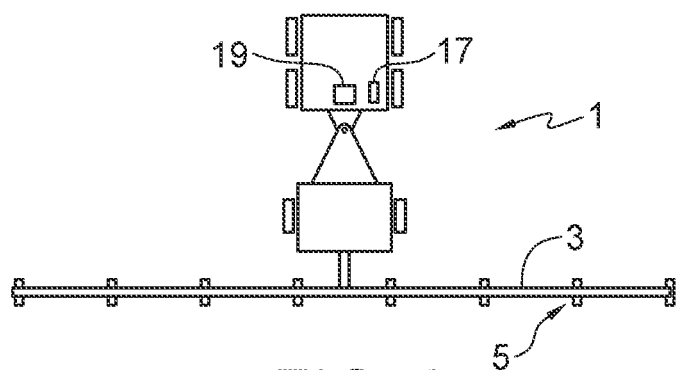
FIG. 3 is a schematic top view of an embodiment of the present disclosure.

FIGS. 1-3 schematically illustrate an embodiment of a mobile sprayer apparatus 1 of the present disclosure comprising a supply conduit 3 operative to supply pressurized liquid to a plurality of nozzle assemblies 5. Each nozzle assembly 5 comprises a channel 7 connecting the supply conduit 3 to a nozzle 9, and a valve 11 operative to selectively open and close the channel 9.

A solenoid coil 13 is operative to selectively move the valve 11 to an open position when a direct current electrical pulse is connected to pass through the solenoid coil 13 in a first direction D1, and to selectively move the valve 11 to a closed position when a direct current electrical pulse is connected to pass through the solenoid coil 13 in an opposite second direction D2. Each solenoid coil 13 has a first end 15A and a second end 15B.

It is contemplated that there will be many arrangements that could be used to provide the required electrical pulses in two directions through the solenoid coil 13. To illustrates however the operation of a DPDT(double pole, double throw) Center OFF Momentary switch 17 is schematically illustrated in FIG. 2. The switch 17 is connected to the direct current electrical supply 19 comprising a positive (+) terminal and a negative (−) terminal and is operative to selectively deliver a pulse of electrical energy through each solenoid coil 13 in the first direction D1 or through each solenoid coil 13 in the second opposite direction D2 and no electrical energy is delivered to the solenoid coils 13 between pulses. To direct a pulse of electrical energy through each solenoid coil 13 in the first direction D1, the switch 17 connects the first end 15A to the positive terminal of the electrical supply 19 and the second end 15B to the negative terminal of the electrical supply 19.

To direct a pulse of electrical energy through each solenoid coil 13 in the second direction D2, the switch 17 connects the first end 15A to the negative terminal of the electrical supply 19 and the second end 15B to the positive terminal of the electrical supply 19.

As shown in FIG. 2 the switch 17 comprises a neutral position NP wherein no pulse is sent, an open position OP located on a first side of the neutral position NP, and a closed position CP located on an opposite second side of the neutral position NP.

When in the open valve position OP the switch 17 sends a pulse through the solenoid coil 13 in the first direction D1 by connecting the first end 15A of the solenoid coil 13 to the positive terminal of the electrical supply 19 and connecting the second end 15B of the solenoid coil 13 to the negative terminal of the electrical supply 19.

When in the closed valve position CP the switch 17 sends a pulse through the solenoid coil 13 in the second direction D2 by connecting the first end 15A of the solenoid coil 13 to the negative terminal of the electrical supply 19 and connecting the second end 15B of the solenoid coil 13 to the positive terminal of the electrical supply 19.

The switch arm 21 is pivotally mounted to the switch about a pivot axis PA and is biased to the neutral position such that when the switch arm is moved to the open or closed positions OP, CP it sends the pulse and then once it is released it moves back to the neutral position NP. An open bias force OBF provided by a spring is operative to bias the switch arm 21 to the neutral position NP and the switch arm 21 is movable to the open position OP against the open bias force OBF, and similarly a closed bias force CBF also provided by a spring is operative to bias the switch arm 21 to the neutral position NP and the switch arm 21 is movable to the closed position CP against the closed bias force CBF.

FIG. 1 schematically illustrates a nozzle assembly 5 that comprises an A-nozzle 9A and a B-nozzle 9B where each of the nozzles 9 is configured to spray substantially the same area of ground. These nozzle assemblies 5 with two or more nozzles can be used to vary the spray rate by turning on nozzle 9A off while 9B is off, or by turning on nozzle 9B while 9B off, or by turning both nozzles 9A, 9B or finally by stopping spraying at the nozzle location by turning both nozzles 9A, 9B off.

In the nozzle assembly of FIG. 1, an A-channel 7A connects the supply conduit 3 to the A-nozzle 9A and an A-valve 11A is operative to selectively open and close the A-channel, 7A and an A-solenoid coil 13A is operative to selectively move the A-valve 11A between the open and closed positions.

Similarly a B-channel 7B connects the supply conduit 3 to the B-nozzle 9B and a B-valve 11B is operative to selectively open and close the B-channel 7B, and a B-solenoid coil 13B is operative to selectively move the B-valve 11B between the open and closed positions.

In the illustration of FIG. 1 the valve 11A is shown in the closed position while valve 11B is shown in the open position.

An A-switch selectively delivers a pulse of electrical energy through each A-solenoid coil 13A in the first direction D1 or through each A-solenoid coil 13A in the second opposite direction D2 and similarly a B-switch 17B selectively delivers a pulse of electrical energy through each B-solenoid coil 13B in the first direction D1 or the second opposite direction D2.

To close the valve 11A the pulse of electrical power moves through the solenoid coil 13 in direction D1 which exerts an electromagnetic force on the piston 23A drawing it down, in conjunction with the bias force SBF exerted by the spring 25A, away from the permanent magnet 27A to the valve closed position shown, and the bias force BF developed by the spring 25A keeps the valve 11A closed with no further current through the coil 13A.

To open the valve 11B the pulse of electrical power moves through the solenoid coil 13 in direction D2 which exerts an electromagnetic force on the piston 23B in the opposite direction drawing it upward against the bias force SBF exerted by the spring 25B, toward the permanent magnet 27B to the valve open position shown, and permanent magnet 27B exerts a force on the piston 23B that overcomes the bias force BF developed by the spring 25B and keeps the valve 11B open with no further current through the coil 13B.

Where a large number of solenoids are to be operated by a pulse from a single switch 17 the direct current electrical supply 19 can comprise a capacitor 29 connected to the positive terminal and to the negative of the direct current electrical supply 19 to build up a sufficient charge to deliver all the pulses to each solenoid coil 13.

The present disclosure allows electrical connections to open and close valves 11 using the limited capacity of mobile sprayers, providing a significantly wider range of options for the use of solenoids on such mobile sprayers.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A mobile sprayer apparatus comprising:
   a direct current electrical supply;
   a supply conduit operative to supply pressurized liquid to a plurality of nozzle assemblies;
   wherein each nozzle assembly comprises:
      a channel connecting the supply conduit to a nozzle;
      a valve operative to selectively open and close the channel;
      a solenoid coil operative to selectively move the valve to an open position when a direct current electrical pulse is connected to pass through the solenoid coil in a first direction, and to selectively move the valve to a closed position when a direct current electrical pulse is connected to pass through the solenoid coil in an opposite second direction;
   a switch connected to the direct current electrical supply and operative to selectively deliver a pulse of electrical energy through each solenoid coil in the first direction or through each solenoid coil in the second opposite direction; and
   wherein no electrical energy is delivered to the solenoid coils between pulses.

2. The apparatus of claim 1 wherein the switch comprises:
   a neutral position wherein no pulse is sent, an open position located on a first side of the neutral position and operative to send a pulse through the solenoid coil in the first direction, and a closed position on an opposite second side of the neutral position and operative to send a pulse through the solenoid coil in the second direction;
   wherein an open bias force is operative to bias the switch to the neutral position and the switch is movable to the open position against the open bias force; and
   wherein a closed bias force is operative to bias the switch to the neutral position and the switch is movable to the closed position against the closed bias force.

3. The apparatus of claim 1 wherein the direct current electrical supply comprises a positive terminal and a negative terminal and wherein the solenoid coil comprises a first contact at a first end of the solenoid coil and a second contact at a second end of the solenoid coil, and wherein the switch is operative to:
   connect the first contact to the positive terminal and to connect the second contact to the negative terminal to move the valve to the open position
   connect the second contact to the positive terminal and to connect the first contact to the negative terminal to move the valve to the open position.

4. The apparatus of claim 1 wherein the direct current electrical supply comprises a capacitor connected to the positive terminal and to the negative terminal.

5. The apparatus of claim 1 wherein each nozzle assembly comprises:
   an A-nozzle and a B-nozzle, each configured to spray substantially the same area;
   an A-channel connecting the supply conduit to the A-nozzle;
   an A-valve operative to selectively open and close the A-channel, and an A-solenoid coil operative to selectively move the A-valve between the open and closed positions;
   a B-channel connecting the supply conduit to the B-nozzle;
   a B-valve operative to selectively open and close the B-channel, and a B-solenoid coil operative to selectively move the B-valve between the open and closed positions; and
   an A-switch connected to the direct current electrical supply and operative to selectively deliver a pulse of electrical energy through each A-solenoid coil in the first direction or through each A-solenoid coil in the second opposite direction; and
   a B-switch connected to the direct current electrical supply and operative to selectively deliver a pulse of electrical energy through each B-solenoid coil in the first direction or through each B-solenoid coil in the second opposite direction.

* * * * *